United States Patent
Gumashta et al.

(10) Patent No.: US 11,614,932 B2
(45) Date of Patent: Mar. 28, 2023

(54) METHOD AND SYSTEM FOR MACHINE LEARNING FRAMEWORK AND MODEL VERSIONING IN A MACHINE LEARNING SERVING INFRASTRUCTURE

(71) Applicant: Salesforce.com, Inc., San Francisco, CA (US)

(72) Inventors: Vaibhav Gumashta, San Francisco, CA (US); Alexandr Nikitin, El Sobrante, CA (US); Yuliya L. Feldman, Campbell, CA (US); Seyedshahin Ashrafzadeh, San Francisco, CA (US); Manoj Agarwal, Cupertino, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/334,617

(22) Filed: May 28, 2021

(65) Prior Publication Data
US 2022/0382539 A1    Dec. 1, 2022

(51) Int. Cl.
  *G06F 8/71*      (2018.01)
  *G06N 20/00*     (2019.01)
  *G06F 9/445*     (2018.01)

(52) U.S. Cl.
  CPC ............ *G06F 8/71* (2013.01); *G06F 9/44536* (2013.01); *G06N 20/00* (2019.01)

(58) Field of Classification Search
  CPC ........ G06F 8/71; G06F 9/44536; G06N 20/00
  See application file for complete search history.

(56) References Cited

U.S. PATENT DOCUMENTS

| | | | |
|---|---|---|---|
| 7,730,478 B2 | 6/2010 | Weissman | |
| 10,043,255 B1 * | 8/2018 | Pathapati | G06N 20/00 |
| 10,713,594 B2 * | 7/2020 | Szeto | G06N 20/00 |
| 11,080,616 B2 * | 8/2021 | Zeiler | G06F 3/048 |
| 11,281,975 B1 * | 3/2022 | Isaksson | G06N 20/00 |
| 2016/0110657 A1 * | 4/2016 | Gibiansky | G06N 20/00 706/12 |
| 2017/0124487 A1 * | 5/2017 | Szeto | G06F 11/1448 |
| 2018/0089592 A1 * | 3/2018 | Zeiler | G06N 20/00 |
| 2019/0073570 A1 * | 3/2019 | Turco | G06F 16/288 |
| 2019/0102700 A1 * | 4/2019 | Babu | G06N 5/025 |
| 2020/0012962 A1 * | 1/2020 | Dent | G06F 9/5011 |
| 2020/0065708 A1 * | 2/2020 | Beaudoin | G06N 3/08 |
| 2020/0272856 A1 * | 8/2020 | Garner | G06Q 10/087 |

(Continued)

OTHER PUBLICATIONS automl.org, "AutoML . . . ", AutoML.org: Freiburg-Hannover, Available Online at <https://www.automl.org>, retrieved on Mar. 9, 2021, 1 page.

(Continued)

*Primary Examiner* — Douglas M Slachta
(74) *Attorney, Agent, or Firm* — Nicholson, De Vos, Webster & Elliott, LLP

(57) ABSTRACT

Machine learning version management method for a prediction service includes receiving a prediction request, determining application metadata for the request that defines routing logic and a machine learning framework version, determining model metadata for the request that defines at least one model and at least one model version, forwarding the prediction request to the at least one model with the at least one model version, and returning a prediction from the at least one model to a requestor.

24 Claims, 6 Drawing Sheets

(56) References Cited

U.S. PATENT DOCUMENTS

2020/0401948 A1* 12/2020 Ma .................... G06F 11/3495
2021/0012404 A1*  1/2021 Kannan ................ G06N 20/00
2021/0089603 A1*  3/2021 Abbasi Moghaddam ..................
                                           G06F 16/9535
2021/0312318 A1* 10/2021 Ambrozic ............ G06N 3/0472
2021/0405984 A1* 12/2021 Agarwal ............. G06F 11/3466

OTHER PUBLICATIONS

Microsoft Research, "AutoML", Available Online at <https://www.microsoft.com/en-us/research/project/automl/>, retrieved on Mar. 9, 2021, 2 pages.

Nabar, Shubha, "Open Sourcing TransmogrifAI: Automated Machine Learning for Structured Data", Available Online at <https://engineering.salesforce.com/open-sourcing-transmogrifai-4e5d0e098da2>, Aug. 16, 2018, 10 pages.

\* cited by examiner

METHOD AND SYSTEM FOR MACHINE LEARNING FRAMEWORK AND MODEL VERSIONING IN A MACHINE LEARNING SERVING INFRASTRUCTURE

TECHNICAL FIELD

One or more implementations relate to the field of version management; and more specifically, to the version management for machine learning frameworks and models in a machine learning service infrastructure.

BACKGROUND ART

Containers are a logical packaging in which applications can execute that is abstracted from the underlying execution environment (e.g., the underlying operating system and hardware). Applications that are containerized can be quickly deployed to many target environments including data centers, cloud architectures, or individual workstations. The containerized applications do not have to be adapted to execute in these different execution environments as long as the execution environment support containerization. The logical packaging includes a library and similar dependencies that the containerized application needs to execute.

However, containers do not include the virtualization of the hardware of an operating system. The execution environments that support containers include an operating system kernel that enables the existence of multiple isolated user-space instances. Each of these instances is a container. Containers can also be referred to as partitions, virtualization engines, virtual kernels, jails, or similar terms.

Machine learning is a type of artificial intelligence that involves algorithms that build a model based on sample data. This sample data is referred to as training data. The trained models can generate predictions, a process also referred to as scoring, based on new data that is evaluated by or input into the model. In this way, machine learning models can be developed for use in many applications without having to be explicitly programmed for these uses.

Containers can be used in connection with machine-learning serving infrastructure. Machine-learning serving infrastructures enable the execution of machine-learning models and provide services to the machine-learning models. Each machine-learning model can be separately containerized with all its required dependencies.

BRIEF DESCRIPTION OF THE DRAWINGS

The following figures use like reference numbers to refer to like elements. Although the following figures depict various example implementations, alternative implementations are within the spirit and scope of the appended claims. In the drawings:

DETAILED DESCRIPTION

Figure 1:
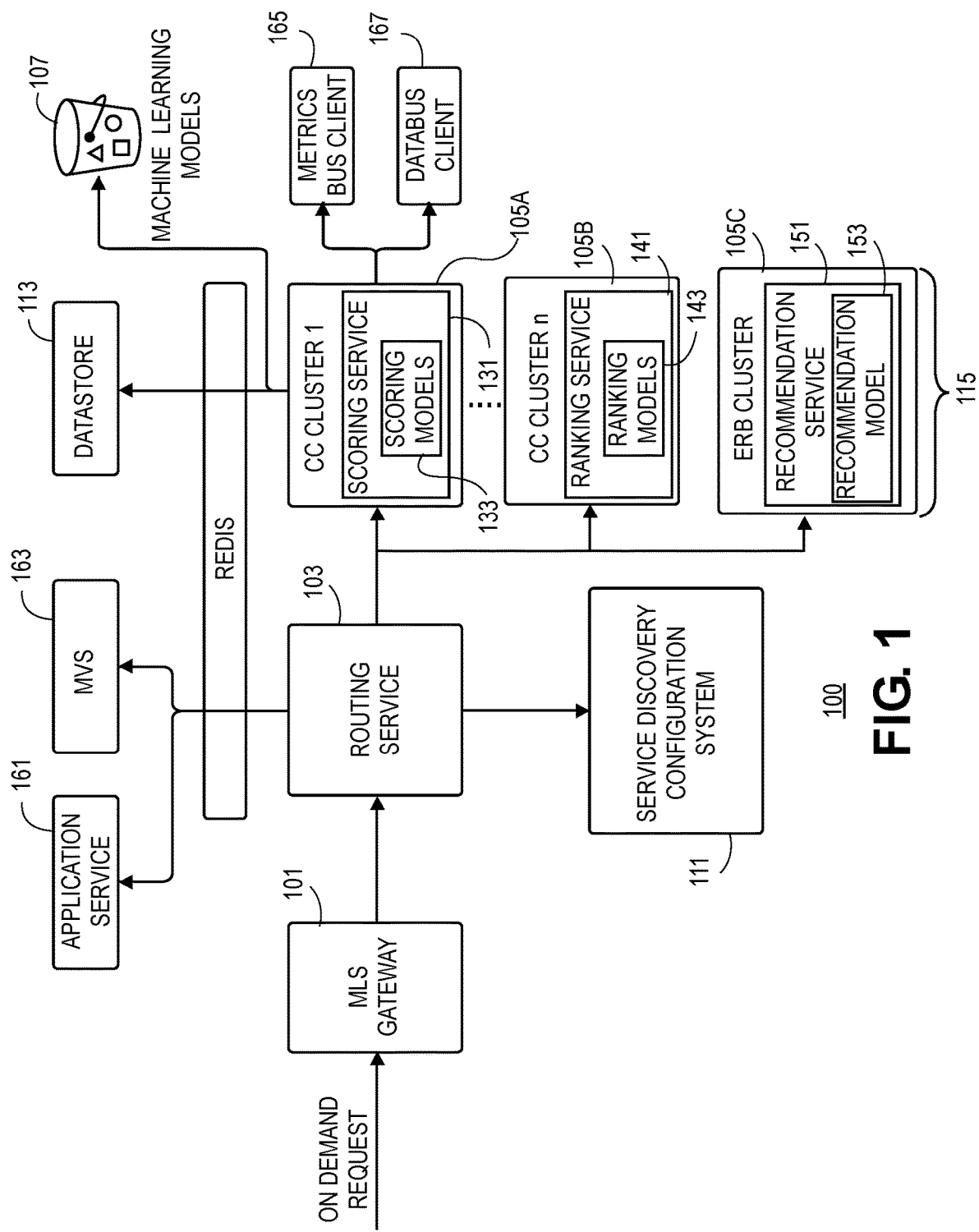
FIG. 1 is a diagram of one example implementation of a machine-learning serving infrastructure that supports a multi-tenant system according to some example implementations.

The following description describes implementations for machine-learning (ML) versioning service (MVS) for an ML serving infrastructure. The MVS enables the ML serving infrastructure to deploy new versions of ML frameworks and ML versions in the ML serving infrastructure including supporting training and routing of requests to the appropriate ML framework and ML model versions. The ML serving infrastructure supports prediction services that are real-time and long running services. Client applications of different tenants can use different ML frameworks and different ML models that can be trained using different data sets and ML framework versions. Thus, the ML serving infrastructure and the prediction services need to support multiple ML frameworks and ML model versions trained on different data sets and/or ML Framework versions at the same time.

Where ML models are utilized in support of applications, there are a wide variety of variety of ML frameworks or libraries (e.g., TransmogrifAI/SparkML Lib, TensorFlow, XGBoost), APIs (HTTP/gRPC, Java interface), programming languages (Java, Python), and related technologies that can be employed any combination. There can be multiple groups (e.g., tenants of a multi-tenant system) that are creating ML models that will be deployed in the same ML serving infrastructure such as in the case where the ML serving infrastructure supports multi-tenancy. The ML models can have different requirements, use cases, and needs. Hence there can be multiple ways to integrate ML models and serve them. The same ML models can also be trained on different data sets. The code or configuration of ML models and ML frameworks can also differ from one to another. Any differences in training, configuration, coding or similar modifications can result in different 'versions' of the ML models or ML frameworks. In some cases, these different versions can be explicitly identified in associated metadata or similar identifying data. In other cases, the different versions can be implicit based on the aforementioned differences and the ML serving infrastructure may need to analyze the ML model or ML framework to identify the different versions based on defined criteria.

As used herein, an application can be any program or software to perform a set of tasks or operations. A machine-learning (ML) model can be a set of algorithms and statistical data structures that can be trained to perform a specific task by identifying patterns and employing inference instead of using explicit instructions. The ML model can be trained for the task using a set of training data.

A machine-learning (ML) serving infrastructure can be automated and organized to support multi-tenancy where containers (e.g., serving containers) can be used to execute the ML models that can service the applications and users of tenants in a multi-tenant system. Within a multitenant system, a software application is designed to provide each tenant with a tenant-specific view of the application including access only to tenant-specific data, configuration, user management, and similar tenant properties and functionality. A tenant can be a group of users who are part of a common organization or share common access privileges to the multi-tenant system and the associated software applications.

FIG. 1 is a diagram of one example implementation of an ML serving infrastructure that supports a multi-tenant system. The machine-learning serving infrastructure 100 includes a machine-learning service (MLS) gateway 101, routing service 103, routing manager 175, service discovery and configuration system 111, set of serving containers 115, and data stores, along with other supporting infrastructure.

A serving container 115 can be an isolated execution environment that is enabled by an underlying operating system, and which executes the main functionality of a program such as an ML model. A serving container 115 can host any number of ML models for any number of tenants. Serving containers 115 can be organized as a cluster. The cluster can be a group of similar entities, such that a cluster of serving containers can be a group of serving container instances or similar grouping. An ML serving infrastructure 100 can host any number of serving containers 115 or clusters of serving containers. Different clusters can host different versions or types of ML models.

In some example implementations, a cluster of serving containers 115 can host all ML models of the same version for all tenants. This organization of the cluster can be limited by the number of ML models that a single-serving container can hold. The ML serving infrastructure 100 can scale to accommodate further additions of ML models even in cases where the number or variety of ML models exceed the capacity of the serving containers 115 in the cluster. Since each ML model's size, which can range from hundreds of kilobytes (KB) to hundreds of megabytes (MB), initialization time, and the number of requests that are serviced, can vary widely based on each tenant's underlying database and usage, some clusters of serving containers 115 may have a high resource usage, while other clusters of serving containers 115 may have a low resource utilization. The resource usage, failure, or addition of any server container in a cluster of serving containers can create the need to rebalance the supporting resources in the clusters of serving containers. When changes in the number or resource usage of the serving containers 115 are implemented, then the routing service 103 can manage the load balancing and routing of requests according to the changes in the organization of the serving containers.

A routing service 103 can be implemented as a set of routing containers, or cluster of routing containers, each implementing instances of the routing service 103 functions or subsets of these functions. The routing service 103 can authenticate any request from any tenant, and then route the request for service by ML models to any serving container 115 in a cluster of serving containers.

The ML serving infrastructure 100 receives requests from tenants via a machine-learning service (MLS) gateway 101 or a similar interface. The MLS gateway 101 or similar interface receives a request from a tenant application and identifies a version or instance of an ML model associated with the request. The MLS gateway 101 or similar interface identifies model information associated with ML models corresponding to a cluster of available serving containers associated with the version of the ML model. The MLS gateway 101 uses the model information to select a serving container from the cluster of available serving containers. If the ML model is not loaded in the serving container, the ML serving infrastructure 100 loads the ML model in the serving container. If the ML model is loaded in the serving container, the system executes, in the serving container (e.g., 105A-C), the ML model (e.g., the scoring models 133) on behalf of the request. The ML serving infrastructure 100 responds to the request based on executing the appropriate ML model on behalf of the request.

In one example, the ML serving infrastructure 100 receives a request for scoring a business opportunity from a Customer Relationship Management (CRM) application or similar application and identifies the request requires executing a version of a particular opportunity scoring ML model. The routing service 103 identifies ML model information including memory and CPU requirements for the scoring ML models in the cluster of scoring serving containers. The routings service 103 applies a load balancing algorithm, resource management algorithm (e.g., a multi-dimensional bin-packing algorithm) to the collected model information to select the serving container 115 that has the best combination of available resources to execute a copy of the specific ML model associated with an incoming request. Loading the specific ML model can also involve ensuring that the correct version of the ML model is loaded which is done in coordination with the ML versioning service (MVS) 163 as further described herein.

If a copy or version of the specific ML model needed to service the incoming request is not already loaded in a serving container 115, then an existing or new serving container loads the required ML model. When a copy of the specific ML model is verified to be loaded in the serving container, then the specific ML model executes the requested service or function, as specified in the received request, in the serving container. A score or similar prediction is thereby generated by the ML model and the ML serving infrastructure 100 can then respond to the request with the generated score via the MLS gateway 101.

The ML serving infrastructure 100 can be implemented in a cloud computing environment in which data, applications, services, and other resources are stored and delivered through shared data centers. The ML serving infrastructure 100 can be implemented via any other type of distributed computer network environment in which a set of servers control the storage and distribution of resources and services for different client users.

The clusters of the example implementation of the ML serving infrastructure 100 can be two of any number of clusters that are serving containers for scoring services. Where a scoring service can be a serving container for any number of ML models that perform scoring, i.e., scoring models. Each cluster can execute different sets of scoring services (e.g., different serving containers) for executing different varieties of ML models (e.g., scoring models). The variation of clusters can correlate with serving different ML frameworks such that a given cluster provides a specific ML framework. Thus, each cluster can correlate with a particular ML framework (e.g., AutoML or similar frameworks). Similarly, each specific ML framework can have a version such that each cluster can offer a specific version of an ML framework. Multiple clusters can offer the same version of an ML framework where there is high usage or demand for that framework as there can be a limit on the number of models per cluster or container and similar load balancing concerns. An incoming request can be serviced by a single ML model of a single cluster (e.g., a scoring model of a given scoring service) or the incoming request can be sub-divided to be serviced by multiple clusters, service containers, and ML models. In some implementations, the clusters and serving containers operate other similar types of ML models other than scoring ML models such as ranking and recommendation models. Scoring is provided as an example rather than by limitation. The clusters can include in some implementations of ranking services and recommendation services, which support ranking models, and recommendation models, respectively. In the illustrated example, the scoring service 133 is an example of a scoring container that executes a set of scoring models 133, the ERB cluster 105C provides a recommendation service 151 container that can implement recommendation models 153 or other functions, and other functions can be supported in other container types (e.g., cc cluster 105B provides ranking service 141 container that service ranking models 143).

In some implementations, the routing service 103 can split the incoming request into separate sub-requests, and then route the sub-requests to their corresponding clusters of serving containers. Although these examples describe the clusters 115 of serving containers that serve one version of the scoring type of ML models, one version of the recommending type of ML models, and one version of the ranking type of machine-learning models, any clusters of any serving containers may serve any number of versions of any number of any types of any ML models and all permutations thereof.

In some implementations, each of the serving containers 115 registers with service discovery and configuration system 111 by providing the serving container's registration information, such as the host, the port, functions, or similar information. When any of the serving containers 115 is no longer available or becomes unavailable, the discovery and configuration system 111 deletes the unavailable serving container's registration information. An available serving container 115 can be referred to as an actual serving container. In other embodiments, a registration process is not required and the service discovery and configuration system 111 can monitor the loading of containers and models to collect the characteristics of each that enable proper routing of requests to these containers and models.

The service discovery and configuration system 111 can be implemented by HashiCorp Consul, Apache Zookeeper, Cloud Native Computing Foundation etcd, Netflix eureka, or any similar tool that provides service discovery and/or a service registration system. The discovery and configuration system 111 can track container information about each serving container and model information about each serving container's machine-learning models. In other implementations, this information can be stored in other locations such as datastore using a format or organization. Container information can be data about an isolated execution environment, which executes the main functionality of an ML model. ML model information can be data about the algorithms and/or statistical models that perform a specific task effectively by relying on patterns and inference instead of using explicit instructions.

The routing service 103 can be deployed with multiple redundant and/or distributed instances so that it is not a single point of failure for the ML serving infrastructure 100. In some implementations, one instance of the routing service 103 acts as a master, while other instances of the routing service 103 are in a hot standby mode, ready to take over if the master instance of the routing service fails, or perform some operations at the direction of the master instance.

A data model information in the service discovery and configuration system 111 provides information about which serving containers 115 are expected to host-specific ML models (e.g., specific version) and which serving containers actually host the specified ML models. The serving containers 115 can coordinate with the service discovery and configuration system 111 to track the actual models being hosted at each container using a model mapping structure in the discovery and configuration system 111. Each of the serving containers 115 can manage a list of executing ML models. If the serving container list does not match the list of expected ML models that a serving container receives, the serving container can load or delete any ML models as needed, and then update its list of executing ML models accordingly.

Every time an ML model is loaded, the serving container registers the ML model including version information in the data model information or the data model information is similarly updated. Therefore, the routing service 103 can route requests for a particular ML model to the serving containers.

When any of the executing serving containers 115 in any of the executing clusters of serving containers dies unexpectedly, or gracefully, the serving container's heartbeat to the service discovery and configuration system 111 fails. The ML serving infrastructure 100 removes the data for the failed serving container from its directory, files, or similar data structures in the service discovery and configuration system 111.

When requests are received by the routing service 103 via the MLS gateway 101, a check of the mapping managed by the routing manager 175 is made to determine if a requested ML model is executing using the service discovery and configuration system 111. If found, then the routing service 103 can forward the requests (or divide the request into a set of sub-requests) to the identified serving containers 115. If an ML model for the request is not found, then the routing manager 175 can load the ML model from a datastore, specialized database, or store (e.g., a simple storage service (S3)), or similar location into a selected cluster and serving container.

In some implementations, the ML serving infrastructure 100 can include any number of additional supporting features and functions. These additional supporting features and functions can include application services, machine-learning versioning services (MVS) 163, redistribution services, and similar functions and services. The application services can be any number, combination, and variety of functions and services for supporting tenant applications and the ML serving infrastructure 100. The MVS can be any number, combination, and variety of functions and services for supporting different versions of ML frameworks, ML models, and similar components of the machine-learning serving infrastructure 100. The redistribution services can be any number, combination, and variety of interconnecting services to enable communication between the components of the ML serving infrastructure 100 and supporting components. In some example implementations, serving containers can interface with or support metrics bus clients, databus clients, and similar components. The metrics bus clients can be services that gather or monitor metrics of the serving containers 115 and similar aspects of the ML serving infrastructure 100. Similarly, the databus clients can be services and functions that enable data communication and access between the serving containers 115 and other components of the ML serving infrastructure 100.

The processes described herein as being performed by the MVS 163 can be performed solely by the MVS 163, in conjunction with other components such as the routing service 103, service discovery and configuration system 111, or in other combinations. Further, the MVS 163 is shown as a separate component of the ML serving infrastructure 100, however, the MVS 163 and any of its processes and functions can be subcomponents of other components such as the routing service 103 rather than discrete components. One skilled in the art would appreciate that the example implementations are provided by way of illustration and not limitation and that other implementations are consistent with that which is described herein.

Figure 2:
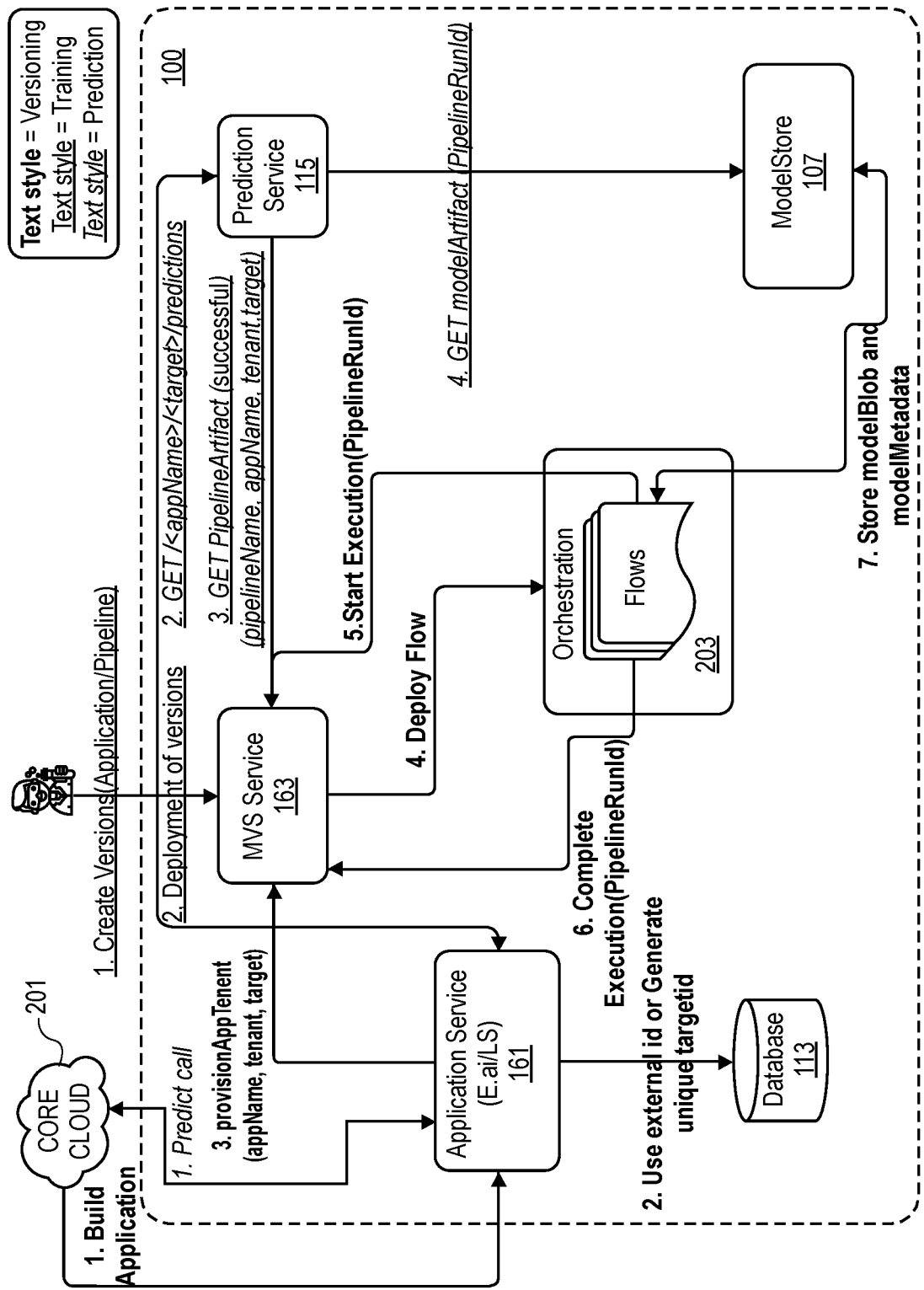
FIG. 2 is a diagram of one example implementation of a machine learning versioning services (MVS) in a machine-learning serving infrastructure according to some example implementations.

FIG. 2 is a diagram of one example implementation of a machine learning versioning services (MVS) in a machine-learning serving infrastructure according to some example implementations. The relevant aspects of the ML serving infrastructure 100 for version management are illustrated and correlate with the components shown in FIG. 1. The components include application services 161, MVS service 163, prediction services 115, orchestration 203, model store 107, database 113, and core cloud 201. The predictions services 115 are an abstraction of the clusters, containers, and models that implement the prediction services. Similarly, the orchestration 203 is an abstraction of the service discovery and configuration system, routing service, and related components that enable the orchestration functions. The core cloud 201 is an example implementation of a multitenant system where tenant applications that generate requests for the prediction services and the ML serving infrastructure 100 can originate.

The functions of these components support versioning by fetching application level metadata from the application service 161, extracting model level metadata from the application level metadata, one application can utilize multiple models, fetching versions of the models to use from MVS 163 and model store 107 services, calling the respective prediction service 115 scoring services based on which provide the requested ML model versions, and performing a fallback process, if errors occur or the selected scoring service does not support the proper version.

The MVS service 163 and related components that support versioning provide several advantages over the prior art. These components support multiple ML framework versions at the same time. Supporting multiple ML framework versions can include us of a shared scoring library (e.g., a set of available ML models), using MVS to decide which scoring cluster/library to route requests to, support for using multiple ML models for generating a score for the same request where each ML model can be served on a different version of their respective scoring library/cluster (i.e., different ML framework versions), and support for different ML framework versions based on tenants configuring different ML framework versions, and tenant applications that use different versions of ML frameworks.

The implementations can also support multiple ML model versions for the same ML framework version. A new ML model can be created using new data while training, creating a new model version, which can be scored using the same ML framework version. For the same ML framework version, a tenant t1, which has been trained using model m1, can score with model m1, whereas another tenant t2, which has been trained using m2, can score with m2.

The implementations can include real time resiliency by using MVS metadata to perform a fallback process in case of errors and when encountering a case where an ML model is not currently running/deployed at a cluster. The fallback process can find a compatible cluster based on semantic versioning or similar mechanisms. In some cases, the implementations can include support for A/B testing, and dark launches. The routing of incoming request traffic to different scoring cluster versions can correlate with A/B testing or a dark launch by differentiating the A/B testing or dark launch using ML framework or ML model versions for the testing or dark launch. The implementations can support cases where a prediction/score on multiple versions can be run at the same time. The implementations can also support auto-deploy/auto-provision and auto-deprovision of a new ML framework version on-demand.

For the described implementations, an application is a unit of granularity. The application is a program or set of functions that run in the core cloud 201 that are tenant specific. The application generates requests for prediction services that are sent to the ML serving infrastructure 100 to be serviced by the appropriate predictions service 115. Each application can potentially have different routing logic defined for handling the requests of that application. This allows multiple applications to route requests to one ML model (global model), and it allows one application to route requests to ML multiple models (e.g., for model chaining, a/b testing and similar use cases).

An application identifier (application id) identifies a specific instance of an application type. Each application id allows each instance of an application type to have separately trained models associated therewith. This enables support for multi-tenancy and multi-model implementations. The application id can be utilized solely within the ML infrastructure 100 or can be global with the core cloud 201 for identifying an instance of the application.

The diagram illustrates three related processes that relate with to the versioning support, versioning, training, and prediction. These processes make multiple calls to application service (AS) 161, MVS 163, and the model store 113 to get model identifiers (uniform resource identifiers (URIs)). In general, the processes fetch an application tree from the AS 161 by an external application id, traverse the application tree (PredictionDefinitions→DataDefinitions→ModelDefinitions), check their statuses and take only enabled ones. The processes fetch a list of approved models from AS for each ModelDefinition. The process gets a ModelArtifact from MVS which indicates the version of the model use. Models chosen to be used are based on MVS artifact, supported versions, training datetime, and similar information. The process fetches model URIs from the model store 107 by model dataset ids, and pass them to the Scoring layer.

As mentioned above, the application is a unit of granularity for the ML serving infrastructure 100. The application defines how the processing of requests, fetching of metadata and versions, service discovery, routing to a scoring container and similar elements. Different applications may have different logic, dependencies, versions, and protocols.

An application can have 0 or more ML definitions. The need for new ML definitions can be driven by multiple targets to predict, multiple models to train and score, different data queries. ML definitions may have different ML versions. An ML definition can have 0 or more ML models. An ML model can be an artifact or a set of artifacts produced by a training job. A particular ML model is trained to create a specific version of the ML model.

The processes of the ML serving infrastructure 100 can include ingesting data, cleaning data, preprocessing, modeling, deployment, and related functions that prepare ML models and enable them to operate on requests. A series of such functions that operate for training, prediction, versioning or similar ML related processes can be referred to as a workflow. The individual functions of the workflow can be separated out and recombined that enable reuse of these functions, such combinations of functions can be referred to as ML pipelines or simply pipelines. The example implementations described herein can refer to the use of ML pipelines and workflows by way of example and not limitation. The ML infrastructure can support the use of ML pipelines and workflows or other more monolithic implementations.

The prediction service 115 of the ML serving infrastructure 100 can interact with the other components to support versioning in different contexts. In these various contexts, the prediction service can fetch a list of ML definitions (e.g., predictionDef/modelDef/target/pipeline), by application id (and optionally application name). ML definitions can have actual statuses (i.e., active, inactive, disabled, or similar status information). The prediction service 115 able to ignore disabled/inactive definitions. This call is similar to the AS application tree call which represents application-level metadata required for real-time scoring. The prediction service is able to fetch a list of all trained models for each ML definition (predictionDef/modelDef/target) and their versions. Multiple models are identified in case of error. The predictions service is able to fetch a model id or model version to use for each ML definition (predictionDef/modelDef/target). Optionally multiple versions can be fetched for a/b testing or fallback processes. The prediction services 115 can fetch a model URI from the model store 107 by model Id.

Returning to the processes shown in FIG. 2, the operation of the components including the applications services 161, MVS 163, orchestration 203, and prediction service 115 can be further understood in relation to the roles and functions they provide in the versioning, training, and prediction processes. In the versioning process, a developer can provide an update to a pipeline or application where this information is provided to the MVS 163 at deployment of the versions. The correlation of the versioning information between the application, pipeline, ML models, ML frameworks, and related components can be provided to the MVS 163, which can track these correlations in support of prediction processes and training processes. The MVS 163 can locally track this versioning information or can store it in a data store 113 or similar data structure.

Figure 3:
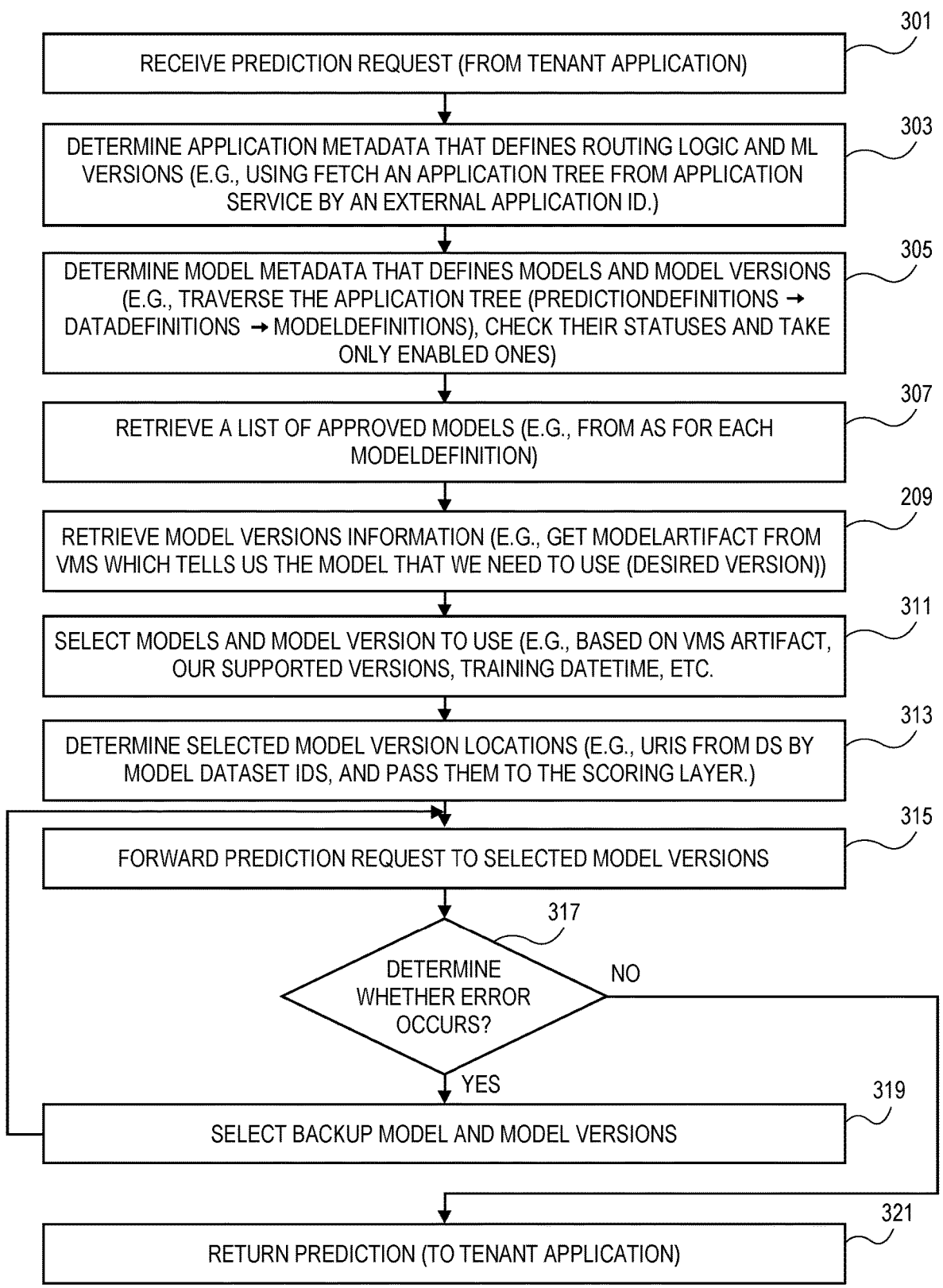
FIG. 3 is a flowchart of one example implementation of a prediction process of the MVS in a machine-learning serving infrastructure according to some example implementations.

FIG. 3 is a flowchart of one example implementation of a prediction process of the MVS in a machine-learning serving infrastructure according to some example implementations. The prediction process can be responsive to the receipt of a prediction request (Block 301). This prediction request can be in the form of a prediction call (e.g., a remote procedure call) from a tenant application in the core cloud 201 or from a similar source. This step is shown in the example of FIG. 2 as step '1 predict call.' The prediction request is initially processed by the application service 161 and/or the MVS 163, which determines the application metadata associated with the received prediction request (Block 303). The application metadata can specify the routing logic and ML framework version that is to be utilized to service the request. This information can be determined by performing a lookup of the application metadata from the data store 113 where the application metadata can be stored as an application tree and referenced by the application id of the requesting application. The application tree can be traversed by a prediction definition to data definition to model definition traversal. This traversal can also retrieve the status of the ML framework that is identified such that enabled ML frameworks are selected where multiple versions are listed.

Once the application metadata is determined, then the application services 161 and/or MVS 163 can determine the model metadata that defines the models and model versions to be utilized to service the prediction request (Block 305). The model metadata can be determined by a traversal of the application tee stored at the data store 113 by use of the application id or application metadata. A listing of the models and model version can be obtained including status information (Block 307). The status information can indicate the enabled/disabled or similar status of each model version such that a model version can be selected and if needed a fallback selection.

With the application metadata, model metadata, ML framework and ML model version listings determined, the application services 161 and/or MVS 163 can select an ML model and/or ML framework to utilize to service the prediction request (Block 311). The ML model and/or ML framework can be selected from the list of available ML models and/or ML frameworks that are enabled or active. If the prediction requests a specific ML model and/or ML framework version then that version can be selected. Where a specific version is not specified, then a most recently trained or approved version can be selected. The applications services 161 and/or MVS 163 can then determine the URI or similar identifier for the selected ML models and/or ML frameworks from the collected metadata or from a further query of the data store 113 (Block 313). The prediction request can then be forwarded along with the selected ML model and/or ML framework versions to the prediction services 115 where the respective URIs can be utilized by the underlying routing services to send the prediction request to the correct serving container (i.e., scoring service) that provides the correct ML framework and that can provide the selected ML model (Block 315). This step is shown in FIG. 2 as step 2 'Get/<appName>/</target>predictions,' which can be a call to the specific functions of the ML model to be utilized to obtain the result of the requested prediction. This call is sent to the prediction services (i.e., the serving container and ML model). The prediction service 115 can then begin to service the prediction request and retrieve, if needed the designated ML model from the model store 107. This step is shown in FIG. 2 as step 3 'GET modelArtifact (PipelineRunId)' where the 'modelArtifact' identifies the ML model to be utilized and an associated pipeline to be utilized.

The process at the MVS 163 can determine whether an error occurred (Block 317) based on a reply from the prediction services 115. If the prediction services returns a result for the prediction request, then the prediction result can be returned to the requesting tenant application (Block 321). If the prediction services 115 fail to load the selected ML model, then an error can be returned to the MVS 163. In response to determining that an error has been returned, then the process can select a next backup ML model and/or ML framework version (Block 319). The backup versions can be selected based on enable/disable status, the most recent training or version upload, or similar criteria. In some cases where the error is returned, the MVS 163 can update the status of the ML model and/or ML framework as disabled or failed.

Figure 4:
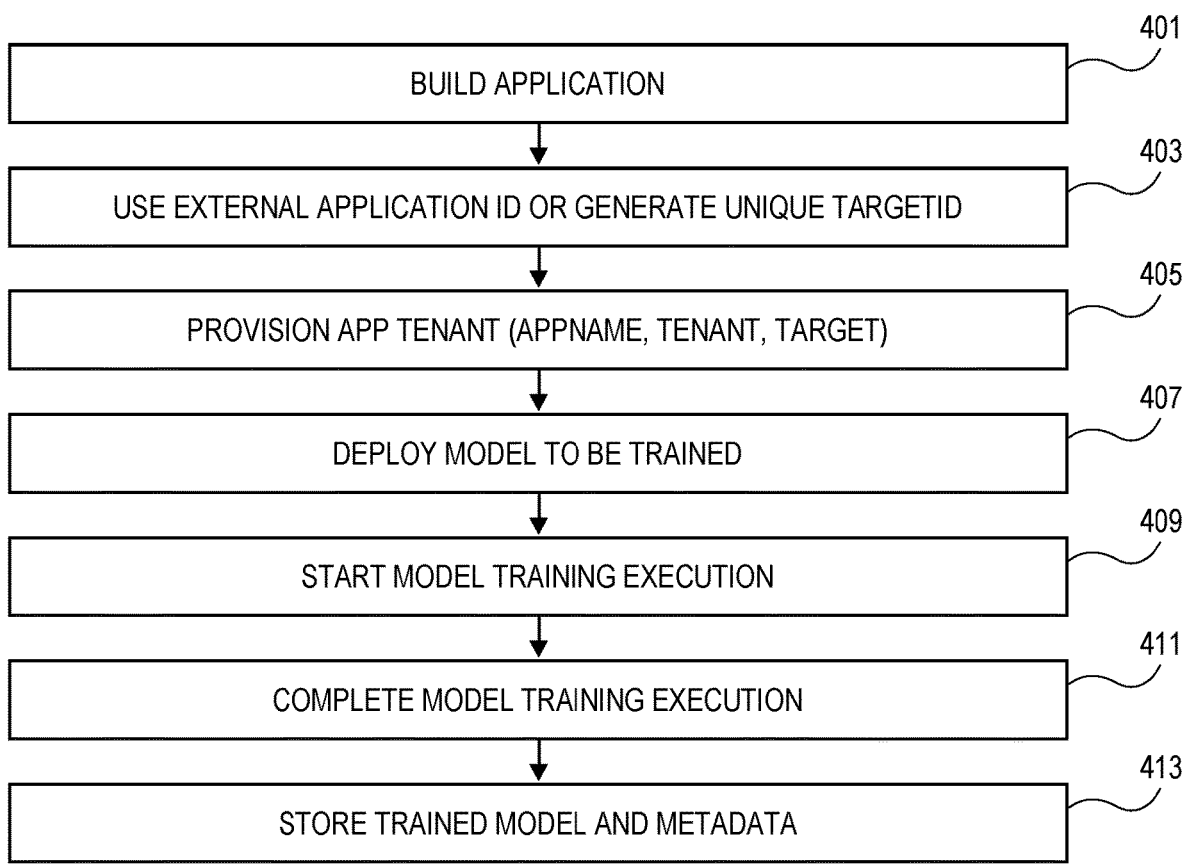
FIG. 4 is a flowchart of one example implementation of a training process supported by the MVS in a machine-learning serving infrastructure according to some example implementations.

FIG. 4 is a flowchart of one example implementation of a training process supported by the MVS in a machine-learning serving infrastructure according to some example implementations. The training process can support training for ML models that generates a new ML model version with a new or updated training of the ML model. The application services can receive an updated build from a tenant of the core cloud 201 (Block 401) and see step 1 of FIG. 2 'Build Application.' The application services can use an external application id or generate unique application id or target identifier (Block 403). The target identifier can be a local application identifier, rather than a global application identifier. The application identifier can be used to look up existing application and/or model metadata from the data store 113. This is shown in step '2 use external id or generate unique target id,' in FIG. 2.

The application services 161 can then provision the tenant application with the MVS service 163 (Block 405), which can set up the tenant application and associated ML model and ML framework versions to be tracked and managed by the MVS 163. The provisioning can be a provision-AppTenant(appname, tenant, target) call to the MVS 163 as shown in step '3' of FIG. 2. The MVS 163 deploys a workflow to the orchestration 203 (Block 407). The workflow defines the sequence for training the ML model such that the training can be automated. The workflow can identify a set of ML pipelines or similar functions to be utilized in the training of the ML model. This step is shown as '4 Deploy Flow' in FIG. 2.

With the workflow deployed to the orchestration 203, the model training can be initiated (Block 409). The model training can be triggered by identifying the ML pipeline (e.g., by pipelinerunid to the orchestration 203. This is shown in FIG. 2 as step '5 start execution(pipelinerunid)' in FIG. 2. The model training can then complete according to the workflow management (Block 411). This is shown in FIG. 2 as '6 complete execution(pipelinerunid).' The resulting trained model can then be stored in the model store 107 for further use by the prediction service 115 (Block 413). This is shown if FIG. 2 as step '7 store modelBlob and modeMetadata.'

The versioning process can also be used in support of other functions such as A/B testing. A/B testing is a process where different configurations of a system are tested without interrupt of the ongoing operation of the system. This enables testing of a new model version to determine whether it is better and works as expected while the system is operating under normal operating conditions and without adversely affecting the regular operation of the system. This testing process can be particularly useful where the ML serving infrastructure is intended to perform real-time prediction processing.

The versioning process and components such as application services and MVS can support the A/B testing. In some cases, a separate experimentation service) would manage and drive A/B testing. The A/B testing can operate by designating a new version of an ML model to be tested and running prediction requests intended for a current version of the ML model on the new version in parallel such that the current version functions as a control version, and the new version is an experiment version.

In some implementations, the versioning process and system supports distributed tracing. Distributed tracing can be supported for easy debugging of issues. An OpenTracing specification can be supported. OpenTracing is agnostic to the header format of the trace context. The implementations can support Zipkin B3 standard or similar standards.

Example Electronic Devices and Environments
Electronic Device and Machine-Readable Media One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals — such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 5A:
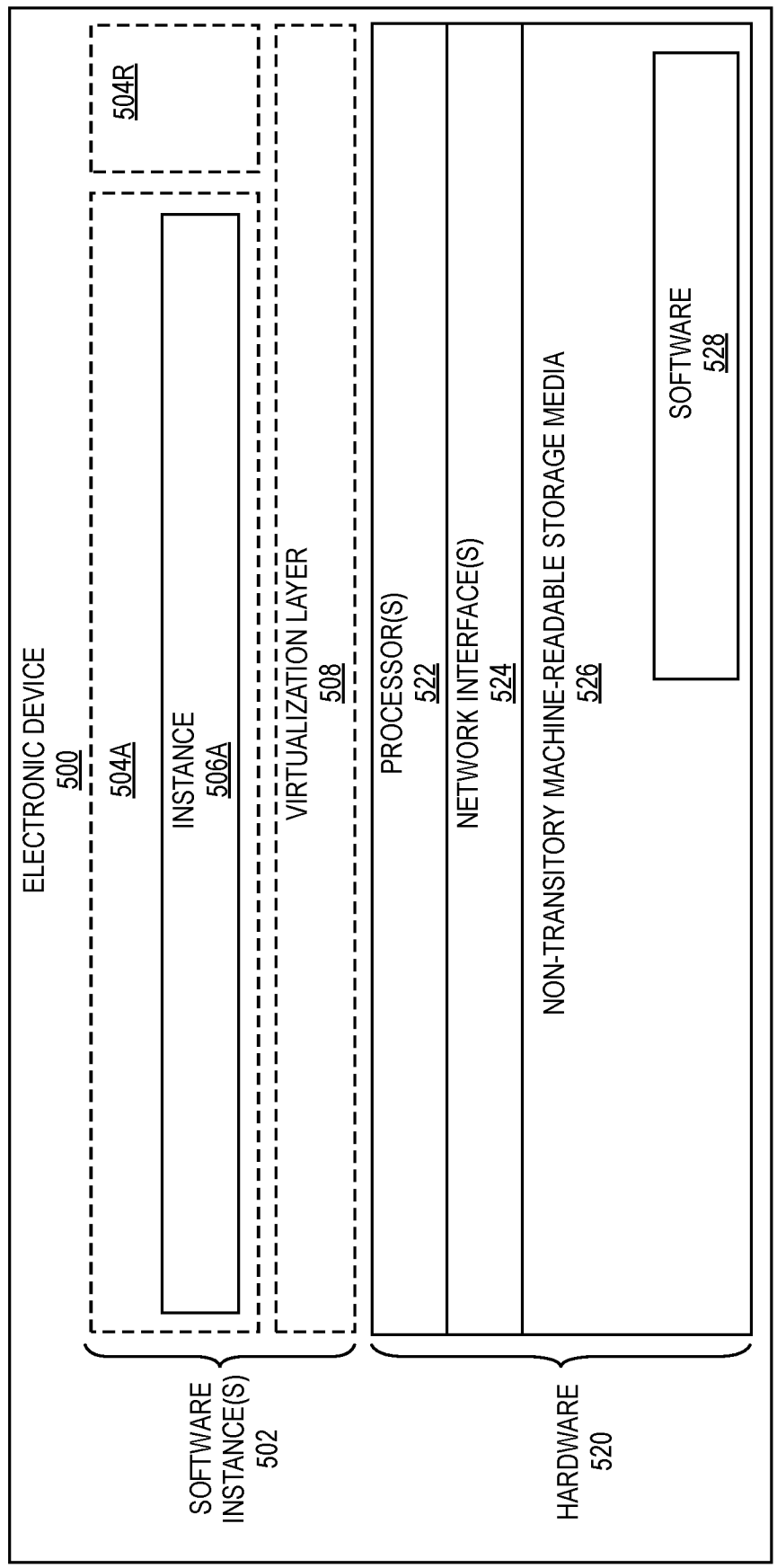
FIG. 5A is a block diagram illustrating an electronic device according to some example implementations.

FIG. 5A is a block diagram illustrating an electronic device 500 according to some example implementations. FIG. 5A includes hardware 520 comprising a set of one or more processor(s) 522, a set of one or more network interfaces 524 (wireless and/or wired), and machine-readable media 526 having stored therein software 528 (which includes instructions executable by the set of one or more processor(s) 522). The machine-readable media 526 may include non-transitory and/or transitory machine-readable media. Each of the previously described clients and the version management service (incorporating the functions described herein across the application services, MVS, prediction services and related components) may be implemented in one or more electronic devices 500. In one implementation: 1) each of the clients is implemented in a separate one of the electronic devices 500 (e.g., in end user devices where the software 528 represents the software to implement clients to interface directly and/or indirectly with the version management service (e.g., software 528 represents a web browser, a native client, a portal, a command-line interface, and/or an application programming interface (API) based upon protocols such as Simple Object Access Protocol (SOAP), Representational State Transfer (REST), etc.)); 2) the version management service is implemented in a separate set of one or more of the electronic devices 500 (e.g., a set of one or more server devices where the software 528 represents the software to implement the version management service); and 3) in operation, the electronic devices implementing the clients and the version management service would be communicatively coupled (e.g., by a network) and would establish between them (or through one or more other layers and/or or other services) connections for submitting prediction requests and model training deployment to the version management service and returning prediction result to the tenant applications. Other configurations of electronic devices may be used in other implementations (e.g., an implementation in which the client and the version management service are implemented on a single one of electronic device 500).

During operation, an instance of the software 528 (illustrated as instance 506 and referred to as a software instance; and in the more specific case of an application, as an application instance) is executed. In electronic devices that use compute virtualization, the set of one or more processor(s) 522 typically execute software to instantiate a virtualization layer 508 and one or more software container(s) 504A-504R (e.g., with operating system-level virtualization, the virtualization layer 508 may represent a container engine (such as Docker Engine by Docker, Inc. or rkt in Container Linux by Red Hat, Inc.) running on top of (or integrated into) an operating system, and it allows for the creation of multiple software containers 504A-504R (representing separate user space instances and also called virtualization engines, virtual private servers, or jails) that may each be used to execute a set of one or more applications; with full virtualization, the virtualization layer 508 represents a hypervisor (sometimes referred to as a virtual machine monitor (VMM)) or a hypervisor executing on top of a host operating system, and the software containers 504A-504R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 528 is executed within the software container 504A on the virtualization layer 508. In electronic devices where compute virtualization is not used, the instance 506 on top of a host operating system is executed on the "bare metal" electronic device 500. The instantiation of the instance 506, as well as the virtualization layer 508 and software containers 504A-504R if implemented, are collectively referred to as software instance(s) 502.

Alternative implementations of an electronic device may have numerous variations from that described above. For example, customized hardware and/or accelerators might also be used in an electronic device.

Example Environment

Figure 5B:
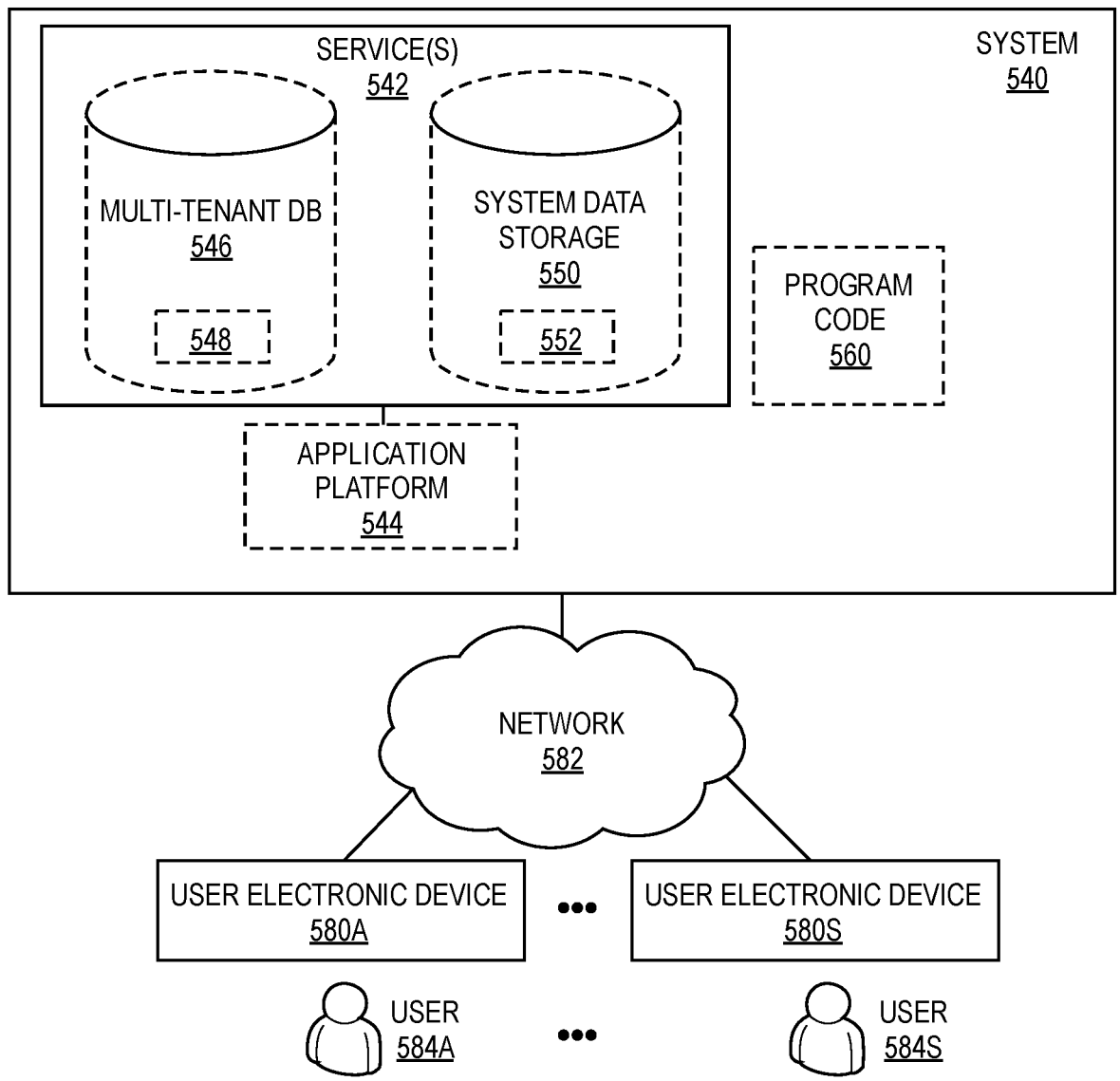
FIG. 5B is a block diagram of a deployment environment according to some example implementations.

FIG. 5B is a block diagram of a deployment environment according to some example implementations. A system 540 includes hardware (e.g., a set of one or more server devices) and software to provide service(s) 542, including the version management service. In some implementations the system 540 is in one or more datacenter(s). These datacenter(s) may be: 1) first party datacenter(s), which are datacenter(s) owned and/or operated by the same entity that provides and/or operates some or all of the software that provides the service(s) 542; and/or 2) third-party datacenter(s), which are datacenter(s) owned and/or operated by one or more different entities than the entity that provides the service(s) 542 (e.g., the different entities may host some or all of the software provided and/or operated by the entity that provides the service(s) 542). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 540 is coupled to user devices 580A-580S over a network 582. The service(s) 542 may be on-demand services that are made available to one or more of the users 584A-584S working for one or more entities other than the entity which owns and/or operates the on-demand services (those users sometimes referred to as outside users) so that those entities need not be concerned with building and/or maintaining a system, but instead may make use of the service(s) 542 when needed (e.g., when needed by the users 584A-584S). The service(s) 542 may communicate with each other and/or with one or more of the user devices 580A-580S via one or more APIs (e.g., a REST API). In some implementations, the user devices 580A-580S are operated by users 584A-584S, and each may be operated as a client device and/or a server device. In some implementations, one or more of the user devices 580A-580S are separate ones of the electronic device 500 or include one or more features of the electronic device 500.

In some implementations, the system 540 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 540 is a multi-tenant cloud computing architecture supporting multiple services, such as one or more of the following types of services: Prediction Services, Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM).

For example, system 540 may include an application platform 544 that enables PAAS for creating, managing, and executing one or more applications developed by the provider of the application platform 544, users accessing the system 540 via one or more of user devices 580A-580S, or third-party application developers accessing the system 540 via one or more of user devices 580A-580S.

In some implementations, one or more of the service(s) 542 may use one or more multi-tenant databases 546, as well as system data storage 550 for system data 552 accessible to system 540. In certain implementations, the system 540 includes a set of one or more servers that are running on server electronic devices and that are configured to handle requests for any authorized user associated with any tenant (there is no server affinity for a user and/or tenant to a specific server). The user devices 580A-580S communicate with the server(s) of system 540 to request and update tenant-level data and system-level data hosted by system 540, and in response the system 540 (e.g., one or more servers in system 540) automatically may generate one or more Structured Query Language (SQL) statements (e.g., one or more SQL queries) that are designed to access the desired information from the multi-tenant database(s) 546 and/or system data storage 550.

In some implementations, the service(s) 542 are implemented using virtual applications dynamically created at run time responsive to queries from the user devices 580A-580S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 560 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 544 includes an application setup mechanism that supports application developers' creation and management of applications, which may be saved as metadata by save routines. Invocations to such applications, including the version management service, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 582 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 540 and the user devices 580A-380S.

Each user device 580A-580S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 540. For example, the user interface device can be used to access data and applications hosted by system 540, and to perform searches on stored data, and otherwise allow one or more of users 584A-584S to interact with various GUI pages that may be presented to the one or more of users 584A-584S. User devices 580A-580S might communicate with system 540 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 580A-580S might include an HTTP client, commonly referred to as a "browser," for sending and receiving HTTP messages to and from server(s) of system 540, thus allowing users 584A-584S of the user devices 580A-580S to access, process and view information, pages and applications available to it from system 540 over network 582.

Conclusion

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A method of machine learning version management for a prediction service, the method comprising:
   receiving, from an application, a prediction request at a machine learning version manager that supports a plurality of machine learning framework versions, wherein each of the plurality of machine learning framework versions supports a plurality of models, and wherein each of the plurality of models supports a plurality of model versions;
   determining based on the prediction request, application metadata that corresponds to the application;
   determining, based on the prediction request and the application metadata, a first machine learning framework version of the plurality of machine learning framework versions and model metadata that corresponds to the first machine learning framework version, wherein the model metadata identifies at least one model of the first machine learning framework version and at least one model version of the at least one model;

forwarding the prediction request to the at least one model with the at least one model version to be executed using the first machine learning framework version; and returning a prediction from the at least one model to the application.

2. The method of claim 1, further comprising:

selecting a backup model and backup model version in response to a failure of the at least one model or at least one model version.

3. The method of claim 1, wherein the plurality of machine learning framework versions can execute in the prediction service.

4. The method of claim 3, wherein a plurality of model versions can execute in any one or more of the plurality of machine learning framework versions.

5. The method of claim 1, further comprising:

selecting the at least one model or the at least one model version based on being a most recent version, an enabled version for the prediction service, or having a most recent training.

6. The method of claim 1, further comprising:

supporting model chaining by routing the prediction request to a plurality of model versions.

7. The method of claim 1, further comprising:

selecting the at least one model version based on the at least one model version having training specific to a tenant application that sent the prediction request.

8. The method of claim 1, wherein the application is a tenant application in a multi-tenancy system, and wherein the plurality of model versions that are supported by each of the plurality of models that are supported by each of the plurality of machine learning framework versions are a plurality of shared model versions and tenant-specific model versions.

9. A non-transitory machine-readable storage medium that provides instructions that, if executed by a set of one or more processors, are configurable to cause the set of one or more processors to perform operations of a method of machine learning version management for a prediction service, the operations comprising:

receiving, from an application, a prediction request at a machine learning version manager that supports a plurality of machine learning framework versions, wherein each of the plurality of machine learning framework versions supports a plurality of models, and wherein each of the plurality of models supports a plurality of model versions;

determining based on the prediction request, application metadata that corresponds to the application;

determining, based on the prediction request and the application metadata, a first machine learning framework version of the plurality of machine learning framework versions and model metadata that corresponds to the first machine learning framework version, wherein the model metadata that defines identifies at least one model of the first machine learning framework version and at least one model version of the at least one model;

forwarding the prediction request to the at least one model with the at least one model version to be executed using the first machine learning framework version; and returning a prediction from the at least one model to the application.

10. The non-transitory machine-readable storage medium of claim 9, the operations further comprising:

selecting a backup model and backup model version in response to a failure of the at least one model or at least one model version.

11. The non-transitory machine-readable storage medium of claim 9, wherein the plurality of machine learning framework versions can execute in the prediction service.

12. The non-transitory machine-readable storage medium of claim 11, wherein a plurality of model versions can execute in any one or more of the plurality of machine learning framework versions.

13. The non-transitory machine-readable storage medium of claim 9, further comprising:

selecting the at least one model or the at least one model version based on being a most recent version, an enabled version for the prediction service, or having a most recent training.

14. The non-transitory machine-readable storage medium of claim 9, further comprising:

supporting model chaining by routing the prediction request to a plurality of model versions.

15. The non-transitory machine-readable storage medium of claim 9, further comprising:

selecting the at least one model version based on the at least one model version having training specific to a tenant application that sent the prediction request.

16. The non-transitory machine-readable storage medium of claim 9, wherein the application is a tenant application in a multi-tenancy system, and wherein the plurality of model versions that are supported by each of the plurality of models that are supported by each of the plurality of machine learning framework versions are a plurality of shared model versions and tenant-specific model versions.

17. An apparatus comprising:

a set of one or more processors;

a non-transitory machine-readable storage medium that provides instructions that, if executed by the set of one or more processors, are configurable to cause the apparatus to perform operations of a method of machine learning version management for a prediction service, the operations comprising:

receiving, from an application, a prediction request at a machine learning version manager that supports a plurality of machine learning framework versions, wherein each of the plurality of machine learning framework versions supports a plurality of models, and wherein each of the plurality of models supports a plurality of model versions;

determining based on the prediction request, application metadata that corresponds to the application;

determining, based on the prediction request and the application metadata, a first machine learning framework version of the plurality of machine learning framework versions and model metadata that corresponds to the first machine learning framework version, wherein the model metadata identifies at least one model of the first machine learning framework version and at least one model version of the at least one model;

forwarding the prediction request to the at least one model with the at least one model version to be executed using the first machine learning framework version; and returning a prediction from the at least one model to the application.

18. The apparatus of claim 17, the operations further comprising:

selecting a backup model and backup model version in response to a failure of the at least one model or at least one model version.

19. The apparatus of claim 17, wherein the plurality of machine learning framework versions can execute in the prediction service.

20. The apparatus of claim 19, wherein a plurality of model versions can execute in any one or more of the plurality of machine learning framework versions.

21. The apparatus of claim 17, the operations further comprising:
selecting the at least one model or the at least one model version based on being a most recent version, an enabled version for the prediction service, or having a most recent training.

22. The apparatus of claim 17, the operations further comprising:
supporting model chaining by routing the prediction request to a plurality of model versions.

23. The apparatus of claim 17, the operations further comprising:
selecting the at least one model version based on the at least one model version having training specific to a tenant application that sent the prediction request.

24. The apparatus of claim 17, wherein the application is a tenant application in a multi-tenancy system, and wherein the plurality of model versions that are supported by each of the plurality of models that are supported by each of the plurality of machine learning framework versions are a plurality of shared model versions and tenant-specific model versions.

* * * * *